United States Patent [19]
Richter

[11] Patent Number: 5,957,035
[45] Date of Patent: Sep. 28, 1999

[54] SWIRLING OSCILLATION COFFEE MAKER

[76] Inventor: Walter M. Richter, 525 Hollyknoll Dr., Churchville, Pa. 18966

[21] Appl. No.: 09/168,114

[22] Filed: Oct. 8, 1998

Related U.S. Application Data

[60] Provisional application No. 60/061,577, Oct. 10, 1997.

[51] Int. Cl.[6] ................. A47J 31/00; A23F 5/26
[52] U.S. Cl. ............... 099/287; 99/306; 99/299; 99/318; 426/433
[58] Field of Search .............. 99/287, 304, 307, 99/306, 318, 295, 299; 426/433

[56] References Cited

U.S. PATENT DOCUMENTS

| | | |
|---|---|---|
| 808,730 | 1/1906 | DeGrody .................. 99/287 |
| 3,565,641 | 2/1971 | King . |
| 3,590,723 | 7/1971 | Dokos et al. ............ 99/299 X |
| 4,074,621 | 2/1978 | Cailliot .................... 99/286 |
| 4,464,982 | 8/1984 | Leuschner et al. ........ 99/287 |
| 4,779,520 | 10/1988 | Hauslein .................. 99/287 |
| 4,962,693 | 10/1990 | Miwa et al. .............. 99/283 |
| 5,340,597 | 8/1994 | Gilbert .................... 426/433 |
| 5,367,947 | 11/1994 | Lussi et al. .............. 99/287 |

*Primary Examiner*—Reginald L. Alexander
*Attorney, Agent, or Firm*—Browdy and Neimark

[57] ABSTRACT

A drip coffee maker rotates the filter basket about a vertical axis, to-and-fro through an angle of about 45 degrees with a frequency of about one second. The coffee may be held in the basket until a predetermined level of hot water has been added to the basket. The basket may be driven by gears acting through an electric motor.

10 Claims, 3 Drawing Sheets

SWIRLING OSCILLATION COFFEE MAKER

CROSS-REFERENCE TO RELATED APPLICATION

This application claims the benefit of the filing date of provisional application Ser. No. 60/061,577, filed on Oct. 10, 1997, the contents of which are hereby incorporated by reference.

FIELD OF THE INVENTION

The present invention relates to drip coffee brewing machines.

REVIEW OF THE RELATED TECHNOLOGY

Most home coffee brewing, and the better commercial brewing, is by the drip method. Hot water falls into a filter basket containing ground coffee, and the coffee chemicals infuse from the bean fragments into the hot water, making coffee. The basket typically has a small hole at the bottom for controlled leakage of brewed coffee into a coffee pot (decanter). The leak rate is designed so that the hot water stays in the basket long enough to brew coffee by infusion from the ground-up beans. A paper filter or fine-mesh sieve in the basket prevents the coffee grounds from passing into the coffee pot.

This method is supposed to make the best coffee, but the coffee is often not as strong as might be desired, or else an excessively large quantity of ground coffee must be used, which is expensive. The basket leakage rate must be high enough that the coffee does not take too long to prepare, i.e. to drip through, lest coffee drinkers become impatient. The hot water thus passes too quickly through the basket to achieve sufficient coffee strength based on the quantity of coffee in the basket, and there is less infusion from the beans.

Another problem is that as the water level drops grounds are left sticking to the paper on the side of the basket. These grounds are removed from the hot water, i.e. contacted by the water only initially, and do not contribute much to the infusion.

Still another problem is lack of mixing of the grounds with the water during brewing, which would increase coffee strength. The grounds cake and hot water can only seep through the packed coffee grounds. Its well known that agitation hastens processes like infusion by permitting more hot water to contact each little bit of coffee-bean surface.

The applicant has found that swirling a coffee basket, that is, rotating the basket to and fro about its vertical axis, is highly effective in increasing the strength of the coffee and also for decreasing the amount of grounds left on the side of the basket. However, the known coffee makers do not swirl. There are "centrifugal" coffee makers, but these spin the basket for centrifuge-separation of the coffee from the grounds, i.e. for separation rather than mixing. Moreover, they are far too complex for home use.

Häuslein U.S. Pat. No. 4,779,520 shows a basket in FIGS. 1 and 2 that is oscillated to-and-fro horizontally in a straight line. The oscillations are driven by an arm 21 eccentrically mounted on a motor 19 (FIG. 1). As explained in column 3, at lines 1–22, the object is to evenly wet the coffee grounds with the hot water. However, the grounds on the sides will not be wetted as much as those at the front and back ends. In addition, the sloshing set up by the machine is liable to wet the countertop as well unless the oscillations are of small amplitude and far from the resonant frequency of the liquid in the basket. The basket occupies more horizontal area, that is its "footprint" is large. The oscillating basket, if it extends past the base of the coffee maker, may knock adjacent appliances.

King's U.S. Pat. No. 3,565,641 discloses agitation for increased brewing strength (columns 2 and 7). King uses compressed air bubbled through the water/grounds mixture to increase the agitation. This avoids the possible sloshing of Häuslein but requires an air pump and a pressure connection to the bottom of the basket. The injected air lowers the temperature of the hot water, decreasing infusion and making the coffee weaker.

Mechanical agitation of the hot water/grounds mixture has been done by agitators immersed in the mixture. An early example is shown in U.S. Pat. No. 808,730 to De Grody. Mechanical agitators are impractical in any brewing machine in which the basket slides out sideways because the agitator must be raised out of the way. An immersed agitator is also another item to be cleaned, and is therefore unsatisfactory.

SUMMARY OF THE INVENTION

Accordingly, the present invention has an object, among others, to overcome deficiencies in the prior art, such as noted above.

The invention thus provides a maker whose basket oscillates automatically to and fro about the vertical central axis of the basket, swirling the water/grounds mixture to increase the strength of the coffee and prevent caking of grounds and deposits of at least partially unused grounds on the side of the basket. In a preferred embodiment, the rotation is preferably through an angle of about 45° with a frequency of about one second.

It has been found that coffee made using a device according to the present invention is stronger for the same measures of ground coffee and water, but the taste is unaffected; that is, coffee made with the swirling action of the present invention is just like coffee made in a conventional machine but using a higher ratio of coffee to water. This saves money and resources.

The novel rotary oscillation provided in a simple manner by the present invention will not build up large waves, that might slosh out, because even if the mixture begins to swirl at high speed it will not spill over until the mixture is forced up the side wall by centrifugal force, and this requires quite a high speed. The "footprint" of the present device is no larger (or at least not significantly larger) than with a conventional coffee maker.

BRIEF DESCRIPTION OF THE DRAWING

The above and other objects and the nature and advantages of the present invention will become more apparent from the following detailed description of an embodiment[s] taken in conjunction with drawings, wherein.

DETAILED DESCRIPTION OF PREFERRED EMBODIMENTS

Figure 1:
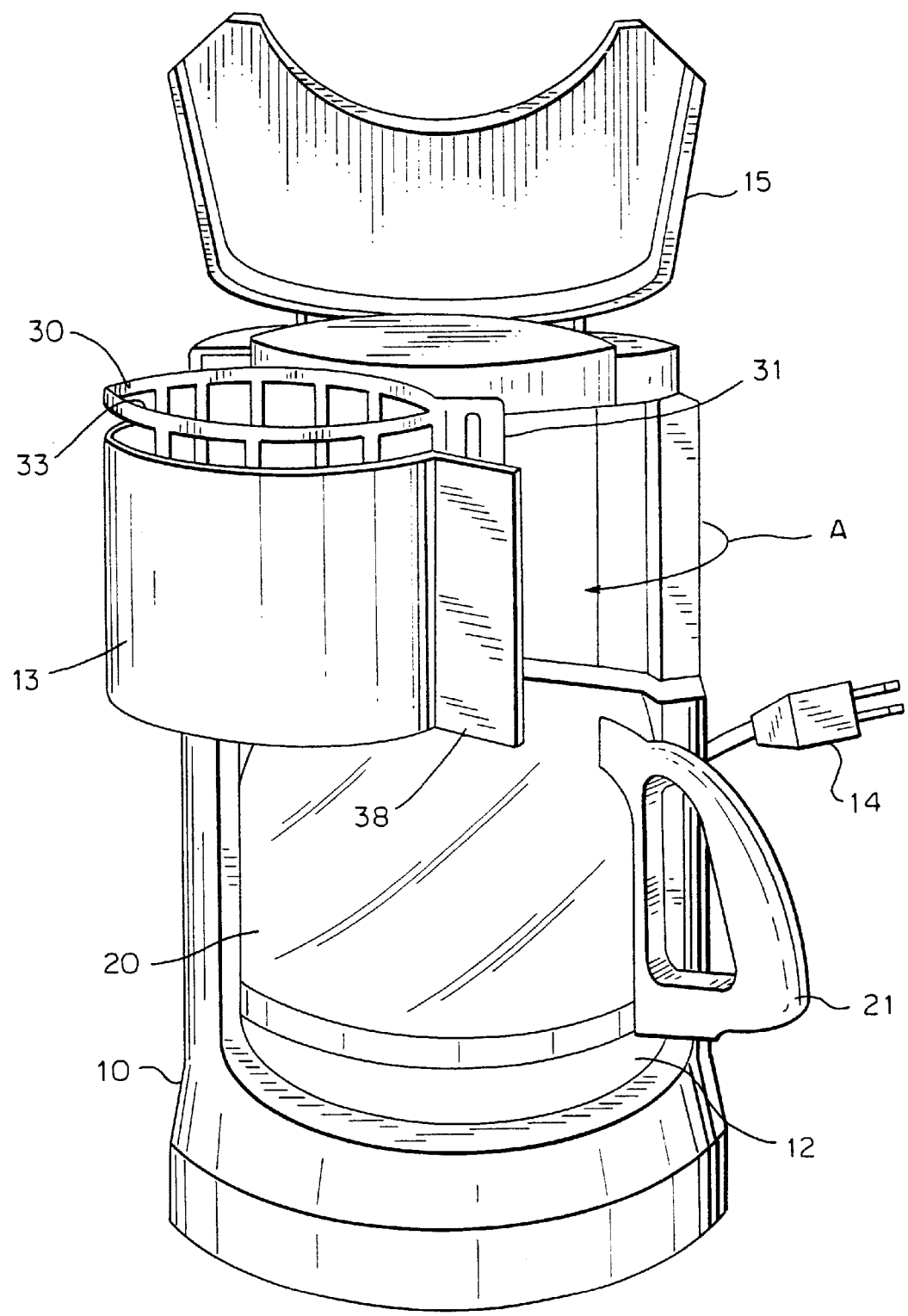
FIG. 1, labelled "prior art", is an exploded perspective view of a conventional coffee maker.

FIG. 1 shows one embodiment of a conventional coffee maker. The present invention shares many of the same elements, or other conventional elements of other conventional coffee makers.

The coffee maker sits on a countertop with a base 10. A coffee pot or decanter 20 sits on a hot-plate surface 12 in the base 10, which is typically heated by an electric resistance heater powered through a conventional electric power cord and plug 14, or could be heated by a flame. This keeps brewed coffee warm. A handle 21 of any desired shape is provided for lifting the decanter 20.

The upper end of the base 10 includes the portions used for making the coffee, including a swivel basket holder 13 which swings out from the base 10 on hinges as shown by arrow A. Alternatively, the basket can slide out horizontally. The basket holder 13 is shaped to support a brewing basket 30. Cold water is poured into a small tank into the upper part of the base 10 (not visible) through a hinged lid 15. Water from this tank is heated and dripped into the basket 30 through a hole in the portion of the base disposed over the basket 30 when the swivel basket holder 13 is swung in all the way, in the direction opposite to arrow A.

The conventional basket 30 as shown in FIG. 1 typically includes a frusto-conical side wall (not visible in FIG. 1), a bottom with a controlled-leak drip hole (not visible), and an outwardly extending rim 33 which mates with the basket holder 13. The basket 30 usually includes a swing-out grip 38, a handle 31 or the like for lifting the basket 30 out of the swivel basket holder 13 when it is in the swung-out position illustrated, or in a slid out position. The rim of the basket holder 13 may include a notch into which the bottom of the handle 31 fits to lock the basket 30 against rotation about its axis.

Figure 2:
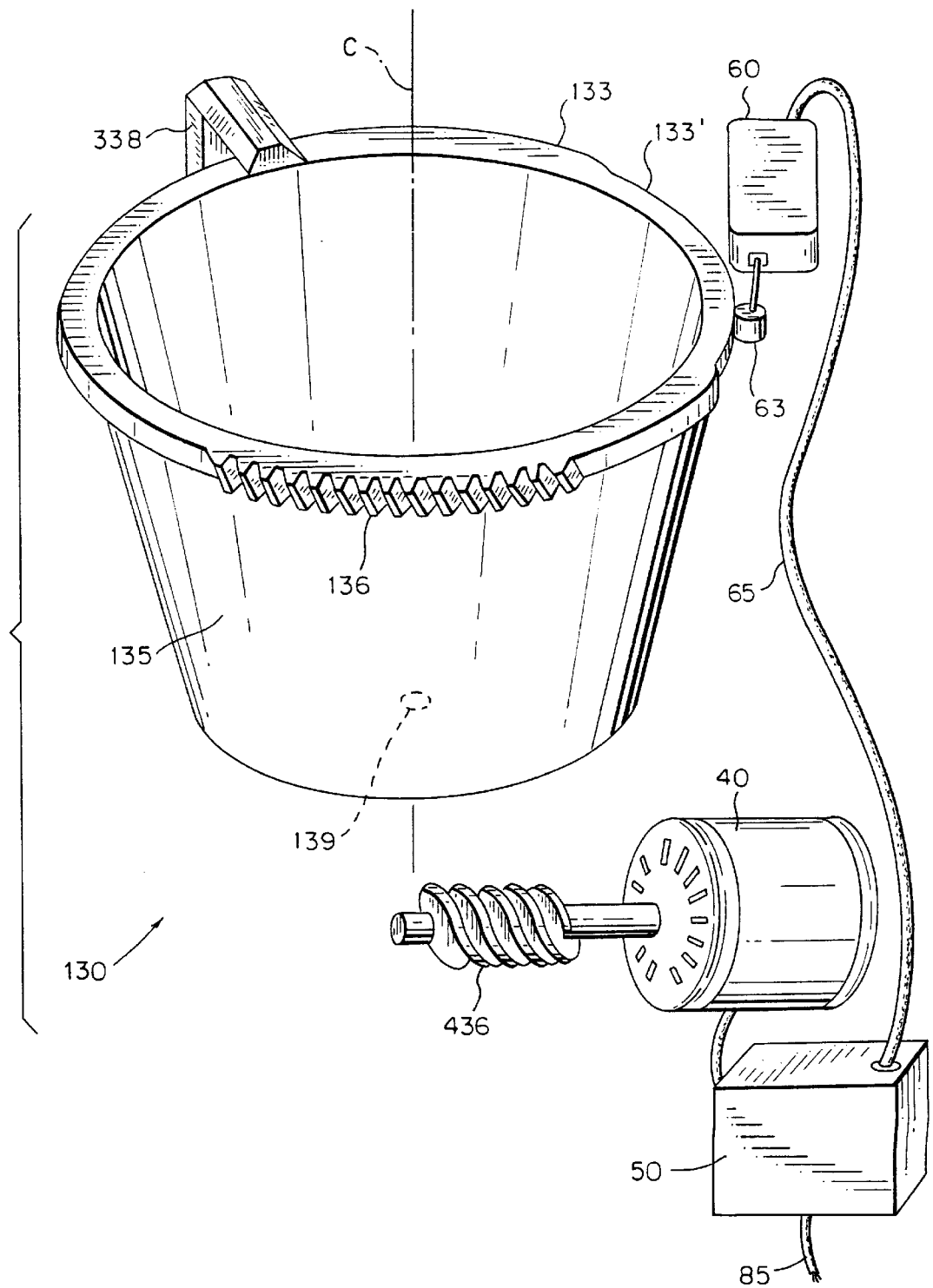
FIG. 2 is a partial view of the invention showing a one embodiment of the basket and oscillation drive means of a device according to the present invention.

FIG. 2 shows a basket 130 according to the present invention which in some respects is similar to the conventional basket of FIG. 1. It preferably includes a cylindrical or frusto-conical side wall 135 with an upper rim, a bottom with a through drip hole 139, and a handle 338. Unlike the conventional basket 30 of FIG. 1, the basket 130 includes a first, wider rim portion 133 which extends outwardly from the upper end of the side wall, and a second, narrower rim portion 133' which does not extend so far. The basket 130 also includes gear teeth 136 in part of the rim 133.

The filter basket 130 revolves around its center axis C, preferably but not necessarily vertical, shown by a dash-dot line, as follows: a worm gear 436 is mounted to a small electric motor 40. In use, the gear 436 mates with the gear teeth 136 of the rim 133, so that when the motor 40 turns, the basket is rotated about the axis C. The basket is held in position by a holder 113 (shown in FIG. 3) which permits it to rotate about the axis C but otherwise holds it stationary, as discussed below.

Preferably the gear teeth 136 mate with the worm gear 436 when the basket holder 113 (shown in FIG. 3) is swiveled into the closed position (e.g. counter to arrow A in FIG. 1). The closed position is that in which hot water can drip down onto the ground coffee in the basket 130 and brewed coffee can drip out of the hole 139. When the coffee maker is powered, the basket 130 is oscillated by the motor 40 turning first in one rotary direction, then in the other, i.e. alternating with clockwise and counter-clockwise directions. The motor rotation is controlled by a microswitch 60 whose arm 63 rides on the rim 133'. When the basket 130 rotates the arm 63 rides up on the greater-diameter rim 133, causing the switch 60 to send an electrical signal to an oscillation control unit 50 through a wire 65.

One possibility is that the switch 60 opens (or closes, depending on the particular circuitry of the unit 50) when the arm 63 rides up. The oscillation control unit 50 then reverses the polarity of power to the motor 40, causing the basket 130 to rotate in the opposite direction. If the arm 63 stays up on the rim for a predetermined period of time, the motor stops. Thus, the basket 130 rotates back and forth about the axis C, for swirling oscillation of the coffee grounds/water mixture. The preferred period is about one second and the preferred angle is about 45 degrees, but these may be varied considerably, e.g. 30° over three-fourths of a second or 60° over 1.5 seconds.

Figure 3:
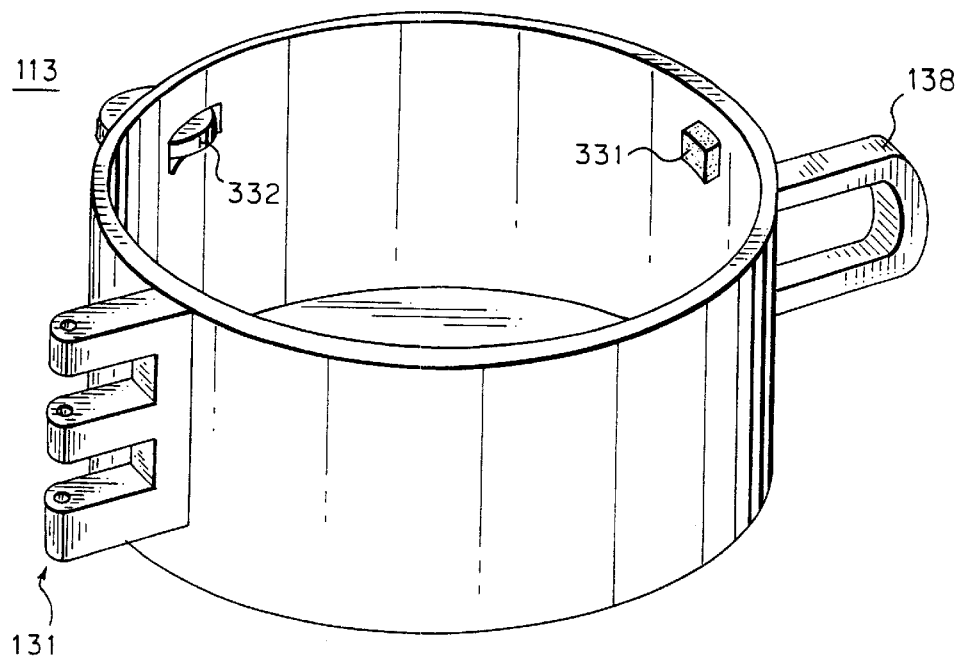
FIG. 3 shows a basket holder according to the present invention including two possible embodiments

FIG. 3 illustrates the basket holder 113 which accepts the basket 130 into its open top end, and which supports the basket 130 and keeps it in position during the oscillation. The basket holder 113 is generally similar to the conventional basket holder 13 of FIG. 1, including a hinge 131 for joining a mating hinge (not shown) on the base of the coffee maker. The hinge 131 allows the basket holder 113 to swivel into and out of the brewing position (see arrow A in FIG. 1.) when moved by a swing-out grip 138. Alternatively, the basket holder may be of the lift-out or slide-out type (not shown), although the swing-out type is preferred.

Because the basket 130 is supported inside the basket holder 113, and rotates, the basket holder 113 of the present invention preferably includes a stop or anti-friction device. Such a stop may comprise a low-friction pad 331 of polyethylene, nylon, or TEFLON, a bearing wheel 332, or any other conventional structure to control and restrict movement.

The oscillations of the hot water/ground coffee mixture in the basket 130 keeps the mixture in contact for a longer time, making the coffee stronger.

Figure 4:
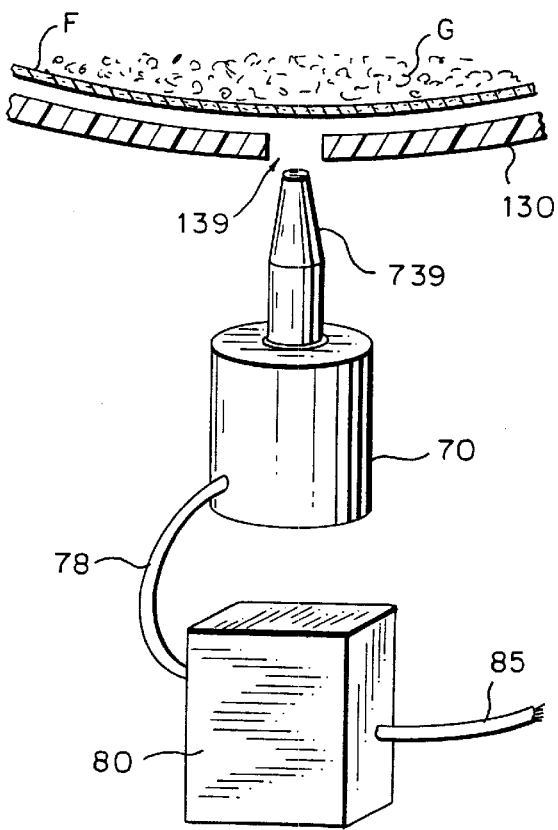
FIG. 4 shows another embodiment according to the present invention, or a feature which can be incorporated into other embodiments.

FIG. 4 shows a that the present invention may also optionally include a stopper 739 for plugging the basket drip hole 139. A coffee filter F and grounds G are also shown. The stopper 739 prevents the coffee from draining for some interval, during which time the mixture is agitated. The stopper 739 is actuated by a plugging unit 70 under the control of a master control unit 80, to which it is coupled by a wire 78. The plugging unit is preferably adapted to swing out of the way of the dripping coffee when the stopper 739 is retracted. The master control unit 80 is also coupled to the oscillation control unit 50 (FIG. 2) through a wire 85. The stopper 739 can also be constructed to carry out the rotary motion of the basket 130, by frictional engagement with the edge of the hole 139.

When the basket holder is closed and the gears 436 and 136 are engaged, the device of the present invention preferably carries out the following operation:

When the coffee maker is switched "on" hot water enters the basket 130, as in the conventional coffee maker. The water increases to a predetermined level in the basket. Then the drip hole 139 is opened by the actuator 70 withdrawing the stopper 739. This may be accomplished by an internal timer in the master control unit 80, or by a conventional weight-responsive switch (not shown), at which time the unit swings out of the way of the dripping coffee.

When the predetermined level is reached, the swirling oscillation is started; it continues until the hot water influx to the basket 130 stops.

The basket of the present invention is preferably round at the rim and frusto-conical in the side wall, as is conventional, but it may include other shapes. The interior surface may include ribs on the bottom, as is conventional, and also ribs on the side wall to impart rotation motion to the mixture (not shown).

Besides the oscillation drive shown, other drive mechanisms are possible. The rim 133 can be driven between two rollers by friction; a rack gear can replace the worm 436, and be driven back and forth in a straight line by a crank coupled to a rotating motor or motor-driven gear; a crank arm hooked into a hole in the basket rim can be attached at its other end to an eccentric; and so on. Any mechanism for rotational oscillation of the coffee basket 130 is within the scope of the invention.

In the following claims, "coffee-brewing substance" includes ground coffee, instant coffee, and coffee substitutes such as chicory, grain preparations, chocolate, etc.; and "coffee" means coffee or any coffee-like beverage prepared by infusion.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

The means and materials for carrying out various disclosed functions may take a variety of alternative forms without departing from the invention. Thus the expressions "means to . . ." and "means for . . ." as may be found in the specification above and/or in the claims below, followed by a functional statement, are intended to define and cover whatever structural, physical, chemical or electrical element or structure may now or in the future exist for carrying out the recited function, whether or not precisely equivalent to the embodiment or embodiments disclosed in the specification above; and it is intended that such expressions be given their broadest interpretation.

The industrial applicability is in coffee brewing. Problems solved by the invention are weak coffee, and complex, expensive and/or large mechanisms.

What is claimed is:

1. A coffee maker of the type having a basket, for holding hot water along with a coffee-brewing substance, and for drip-brewing coffee, the improvement comprising:

means for rotating the basket about an axis, alternately in a first direction of rotation and then in a second direction of rotation, such that a mixture of the hot water and the coffee-brewing substance oscillates to and fro in a swirling motion, whereby coffee strength is increased and adhesion of the coffee-brewing substance to side walls of the basket is inhibited.

2. The improvement according to claim 1, including means for rotating the basket through an angle of approximately 45 degrees of arc.

3. The improvement according to claim 2, including means for rotating the basket at a frequency of approximately one second.

4. The improvement according to claim 1, wherein the basket includes a single drip hole and the coffee maker includes a drip hole stopper.

5. The improvement according to claim 1, wherein the means for rotating the basket includes gear teeth on a rim of the basket.

6. The improvement according to claim 1, wherein the basket includes an open top and the axis is generally vertical.

7. A process of brewing coffee from hot water and a coffee-brewing substance, comprising:

providing a basket;

placing the hot water into the basket along with a coffee-brewing substance;

rotating the basket about an axis, alternatingly in a first direction of rotation and a second direction of rotation, such that a mixture of the hot water and the coffee-brewing substance oscillates to and fro in a swirling motion, whereby coffee strength is increased and adhesion of the coffee-brewing substance to side walls of the basket is decreased; and removing the coffee from the basket.

8. The process according to claim 7, wherein the step of removing the coffee is not performed until the step of rotating the basket is performed.

9. The process according to claim 7, wherein the step of rotating the basket is not performed until a predetermined level of the hot water in the basket is reached.

10. The process according to claim 8, wherein the step of removing the coffee is not performed until the step of rotating the basket is performed.

* * * * *